(12) United States Patent
Kuoch

(10) Patent No.: US 8,378,883 B2
(45) Date of Patent: Feb. 19, 2013

(54) DEVICE AND METHOD OF DETECTING A TARGET OBJECT FOR MOTOR VEHICLE

(75) Inventor: Siav Kuong Kuoch, Saint Maur des Fosses (FR)

(73) Assignee: Valeo Vision, Bobigny (FR)

( * ) Notice: Subject to any disclaimer, the term of this patent is extended or adjusted under 35 U.S.C. 154(b) by 452 days.

(21) Appl. No.: 12/640,239

(22) Filed: Dec. 17, 2009

(65) Prior Publication Data

US 2010/0156699 A1 Jun. 24, 2010

(30) Foreign Application Priority Data

Dec. 18, 2008 (FR) .................................... 08 07165

(51) Int. Cl.
*G01S 13/93* (2006.01)
(52) U.S. Cl. ............... 342/70; 342/71; 342/95; 342/195
(58) Field of Classification Search ............ 342/70–72, 342/95–97, 195
See application file for complete search history.

(56) References Cited

U.S. PATENT DOCUMENTS

| | | | | |
|---|---|---|---|---|
| 5,754,099 A * | 5/1998 | Nishimura et al. | ........... | 340/435 |
| 6,249,243 B1 | 6/2001 | Takagi | | |
| 6,380,884 B1 * | 4/2002 | Satou et al. | ...................... | 342/70 |
| RE37,725 E * | 6/2002 | Yamada | ........................... | 342/72 |
| 6,518,916 B1 | 2/2003 | Ashihara et al. | | |
| 6,661,370 B2 * | 12/2003 | Kishida et al. | ................ | 342/128 |
| 6,768,446 B2 * | 7/2004 | Tamatsu et al. | ................. | 342/70 |
| 6,853,906 B1 * | 2/2005 | Michi et al. | ..................... | 701/521 |
| 6,862,527 B2 * | 3/2005 | Okamura et al. | ............. | 701/301 |
| 7,187,269 B2 * | 3/2007 | Ohdachi et al. | ............. | 340/425.5 |
| 8,165,797 B2 * | 4/2012 | Sawamoto et al. | ........... | 701/301 |
| 8,248,295 B2 * | 8/2012 | Tsunekawa | ..................... | 342/70 |
| 2003/0128153 A1 * | 7/2003 | Paradie et al. | .................. | 342/70 |
| 2003/0142007 A1 * | 7/2003 | Ono et al. | ........................ | 342/70 |
| 2003/0174054 A1 * | 9/2003 | Shimomura | .................. | 340/435 |
| 2003/0218563 A1 * | 11/2003 | Miyahara | ........................ | 342/70 |
| 2010/0109937 A1 * | 5/2010 | Koike | .............................. | 342/70 |
| 2010/0156699 A1 * | 6/2010 | Kuoch | ............................. | 342/70 |
| 2011/0001615 A1 * | 1/2011 | Kuoch et al. | .................. | 340/436 |
| 2011/0002507 A1 * | 1/2011 | Kuoch et al. | .................. | 382/103 |

FOREIGN PATENT DOCUMENTS

| | | | |
|---|---|---|---|
| EP | 1020736 A2 | | 7/2000 |
| EP | 1094336 A2 | | 4/2001 |
| EP | 2199826 A1 | * | 6/2010 |
| FR | 2947223 A1 | * | 12/2010 |
| JP | 2010145406 A | * | 7/2010 |

* cited by examiner

*Primary Examiner* — John B Sotomayor
(74) *Attorney, Agent, or Firm* — Jacox, Meckstroth & Jenkins

(57) ABSTRACT

A device and method for correcting a position of at least one target point relative to a motor vehicle depending on a movement of the motor vehicle over a given number of cycles; starting from at least one target point, forming a first group with adjacent target points depending on a first given characteristic; verifying if the first group is homogeneous depending on a second given characteristic; and calculating a position of a formed group relative to the motor vehicle over the given number of cycles, a formed group corresponding to a target object.

20 Claims, 12 Drawing Sheets

Fig_1

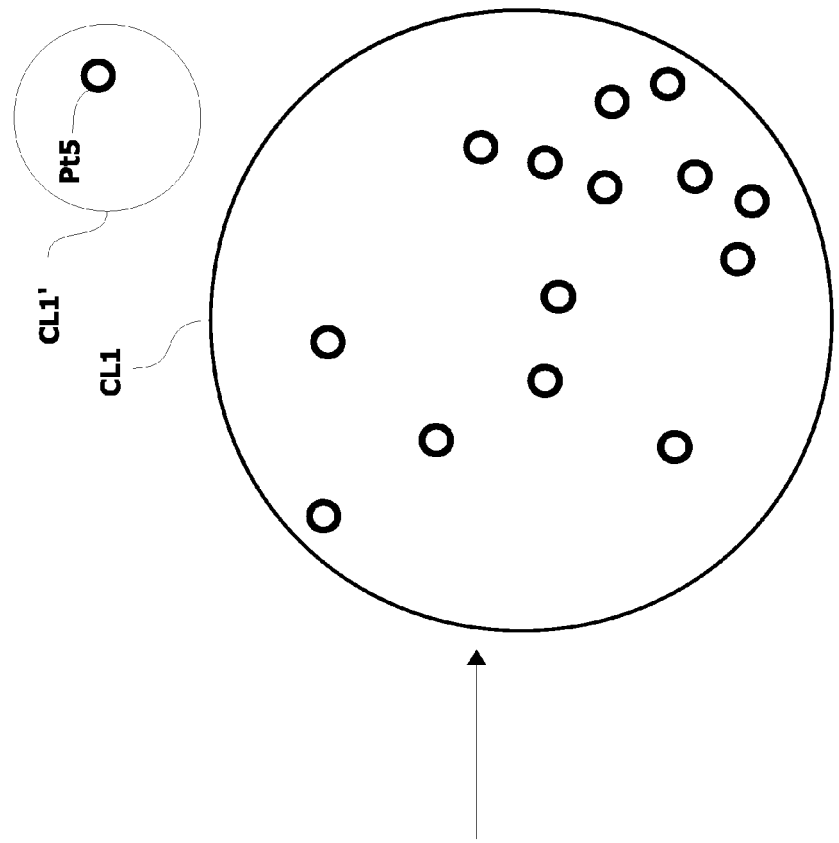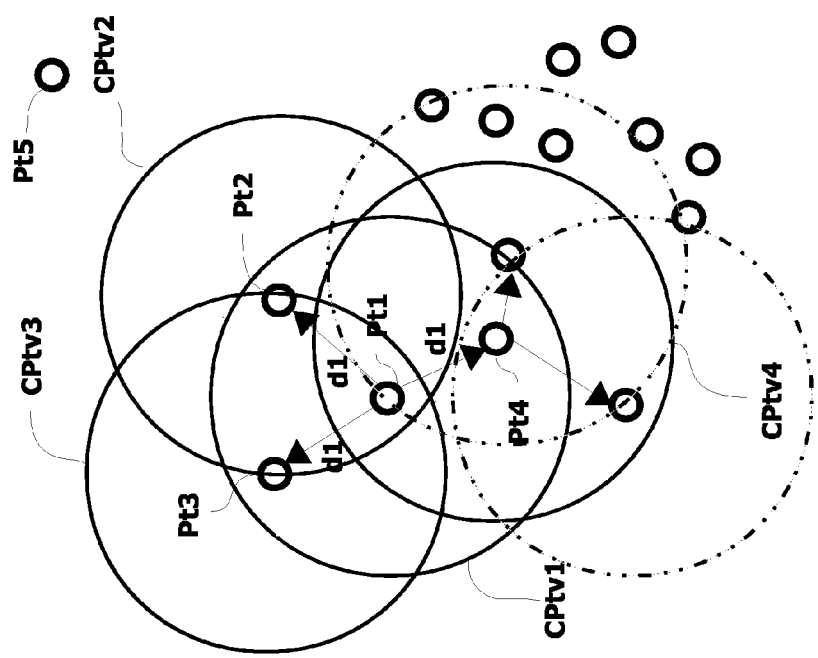
Fig. 5

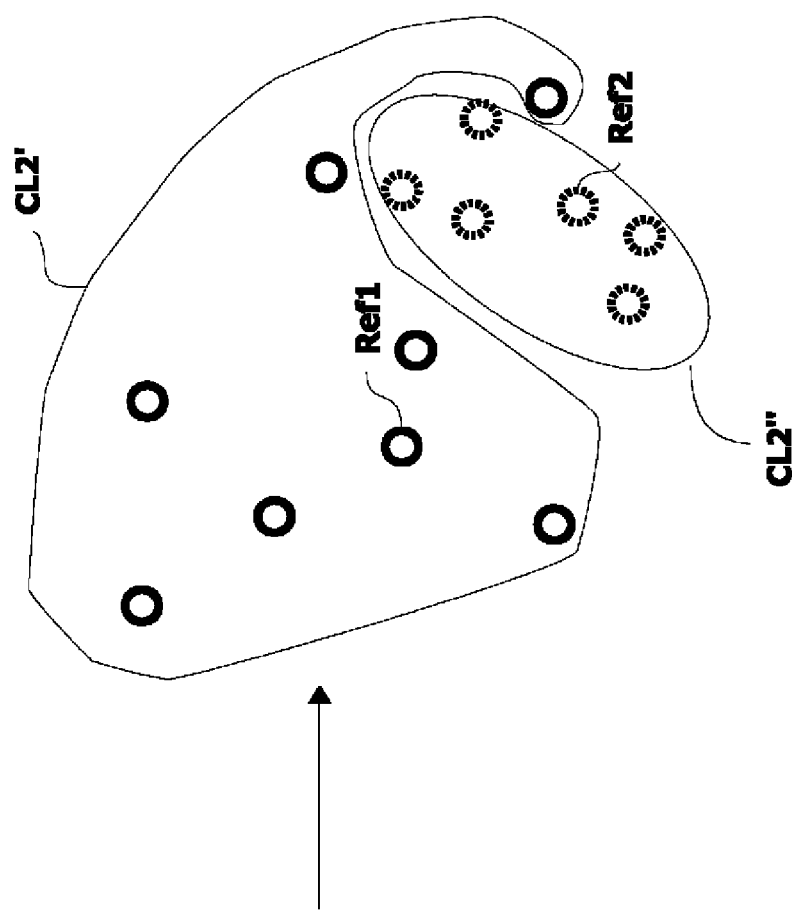
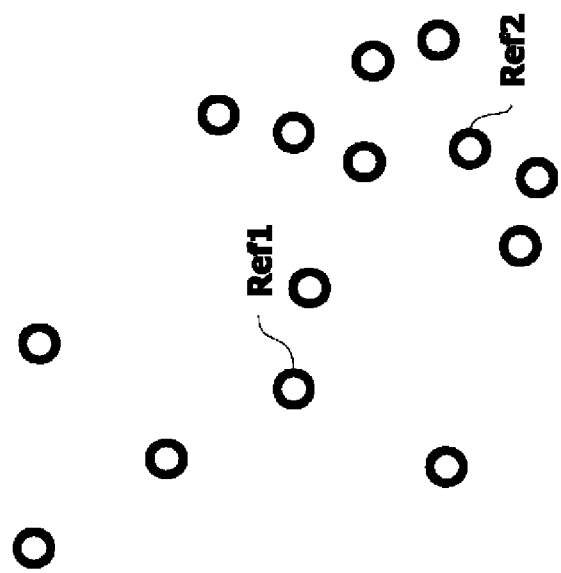
Fig. 7

DEVICE AND METHOD OF DETECTING A TARGET OBJECT FOR MOTOR VEHICLE

CROSS-REFERENCE TO RELATED APPLICATIONS

This application claims priority to French Application No. 0807165 filed Dec. 18, 2008, which application is incorporated herein by reference and made a part hereof.

BACKGROUND OF THE INVENTION

1. Field of the Invention

The present invention concerns a method of detecting a target object for motor vehicle and a detection device for implementing the method.

It finds a particular application in the field of motor vehicles.

2. Description of the Related Art

In the field of motor vehicles, a known prior art method of detecting a target object for motor vehicle uses radar scanning of the front environment of the motor vehicle to return information comprising a set of points representative of the target objects, such as vehicles followed or cross traffic. Such a method is implemented by a radar mounted at the front of a motor vehicle.

A drawback of this prior art is that the information returned by the radar is often noisy and unstable and it is therefore difficult to differentiate target objects from noise, a fixed object from a mobile object, and finally one object close to another in the environment of the motor vehicle.

What is needed, therefore, is a detection device and method that improves over the prior art.

SUMMARY OF THE INVENTION

An aim of the present invention is a method of detecting a target object for motor vehicle that solves the problem stated above.

According to a first object of the invention, this aim is achieved by a method of detecting a target object for a motor vehicle, wherein it includes the steps of:
  correcting a position of at least one target point relative to a motor vehicle depending on a movement of the motor vehicle over a given number of cycles;
  starting from at least one target point, forming a first group with adjacent target points depending on a first given characteristic;
  verifying if the first group is homogeneous depending on a second given characteristic; and
  calculating a position of a formed group relative to the motor vehicle over the given number of cycles, a formed group corresponding to a target object.

As described in detail hereinafter, grouping target points and verifying their homogeneity in particular enables target objects to be differentiated (according to their speed and noise) and their position to be calculated reliably.

According to non-limiting embodiments of the invention, the method further has the following features:

The method includes an additional step of detecting a plurality of target objects in an environment of the motor vehicle relative to the motor vehicle, resulting in a plurality of representative target points and their respective positions. Knowing this position parameter enables tracking thereof thereafter to be automated.

The step of forming a first group includes a sub-step of applying the first given feature successively to adjacent points. This limits the number of calculations.

The method includes an additional step of eliminating any first group comprising a number of target points less than a first given number. This eliminates first groups that are very small and therefore considered as noise.

The second given feature is a power. This makes it possible to differentiate one target object from another, each object sending back a different energy.

The second given feature is a speed. This makes it possible to distinguish between target objects that are mobile or fixed.

The method includes an additional step in which, if a group is heterogeneous, target points of a first group are grouped around two reference target points, the combination forming two second groups, so as to minimize the inertia of a second group. This makes it possible to differentiate two target objects that are close to each other.

Grouping into a second group is effected by means of a Ward Index. This makes it possible to have homogeneous second groups of target points without calculating the inertia of a second group.

The method includes an additional step of, starting from at least one target point of a second group, forming a first group with adjacent target points depending on a first given feature. This eliminates second groups that are very small and therefore considered to be noise.

The first given feature is a distance less than a distance threshold between a target point and adjacent target points. This limits the number of calculations.

A position of a group is calculated laterally and longitudinally. This characterizes the position.

The method includes an additional step of applying a Kalman filter to two successive positions of a formed group. This stabilizes the calculation of a position in time.

According to a second object of the invention, a device for detecting a target object for motor vehicle is characterized in that it includes a control unit for:
  correcting a position of at least one target point relative to a motor vehicle depending on a movement of the motor vehicle over a given number of cycles;
  starting from at least one target point, forming a first group with adjacent target points depending on a first given characteristic;
  verifying if the first group is homogeneous depending on a second given characteristic; and
  calculating a position of a formed group relative to the motor vehicle over the given number of cycles, a formed group corresponding to a target object.

In one non-limiting embodiment of the invention, the device further includes a detector for detecting a plurality of target objects in an environment of the motor vehicle relative to the motor vehicle, resulting in a plurality of representative target points and their respective positions.

According to a third object of the invention, a computer program product includes one or more sequences of instructions executable by an information processing unit, the execution of the sequences of instructions implementing the method according to any one of the preceding features.

These and other objects and advantages of the invention will be apparent from the following description, the accompanying drawings and the appended claims.

BRIEF DESCRIPTION OF THE ACCOMPANYING DRAWINGS

Other features and advantages of the present invention will become clearer in the light of the non-limiting description and drawings, in which drawings:

FIG. 5 represents the formation of a first group from at least one target point from FIG. 4 according to a step of the FIG. 1 detection method;

FIG. 7 represents the determination of the homogeneity of a first group from FIG. 5 and the determination of two reference target points according to a step of the FIG. 1 detection method;

DETAILED DESCRIPTION OF NON-LIMITING EMBODIMENTS OF THE INVENTION

Figure 1:
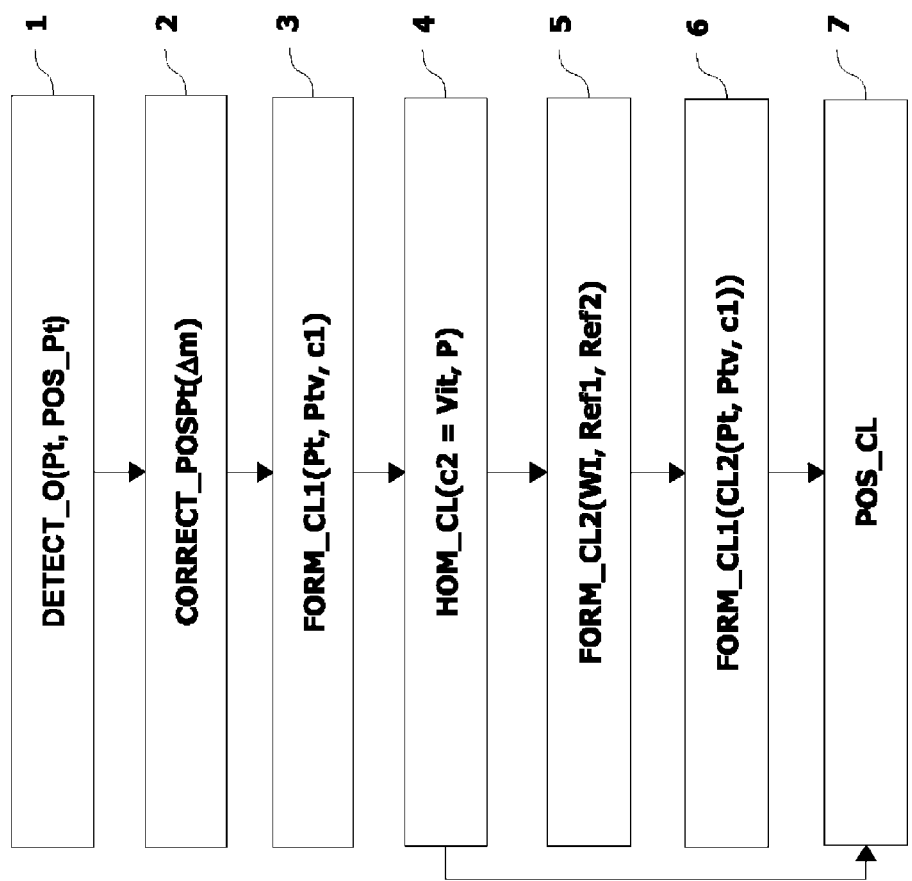
FIG. 1 represents a flowchart of the detection method according to one non-limiting embodiment of the invention.

The method of the invention of detecting a target object for motor vehicle is described by means of a non-limiting example shown in FIG. 1.

By motor vehicle is meant any vehicle including an engine. The detection method includes the following steps shown in FIG. 1:
- correcting a position POS_Pt of at least one target point Pt relative to a motor vehicle V depending on a movement Dm of the motor vehicle V over a given number of cycles Ncy (step CORRECT_POSPt(Dm));
- starting from at least one target point Pt, forming a group CL with adjacent target points Ptv depending on a first given characteristic c1 (step FORM_CL (Pt, Ptv, c1);
- verifying if the first group CL is homogeneous depending on a second given characteristic c2 (step HOM_CL (c2=Vit, P)); and
- calculating a position of a formed group CL1, CL2 relative to the motor vehicle V over the given number of cycles Ncy, a formed group CL1, CL2 corresponding to a target object O (step POS_CL).

In a non-limiting embodiment, the method further includes an additional step in which, if a group is heterogeneous, target points of a first group CL1 are grouped around a reference target point Ref1, Ref2, the combination forming at least one second CL2 so as to limit the inertia of the second group CL2 (step FORM_CL2(WI, Ref1, Ref2)).

In one non-limiting embodiment of the invention, the method further includes an additional step of detecting a plurality of target objects O in an environment E of the motor vehicle relative to the motor vehicle V, resulting in a plurality of representative target points Pt in their respective position (step DETECT_O(Pt, POS_Pt)).

Note that this additional step need not be included in the method described, and can form part of another method executed upstream of the method described.

In the non-limiting embodiment of the invention described in the remainder of the description, the method includes this additional step.

The steps of the method are described in detail hereinafter.

In a first step 1 (FIG. 1), a plurality of target objects O are detected in an environment of the motor vehicle relative to the motor vehicle, resulting in a plurality of representative target points Pt in their respective position POS_Pt.

Figure 2:
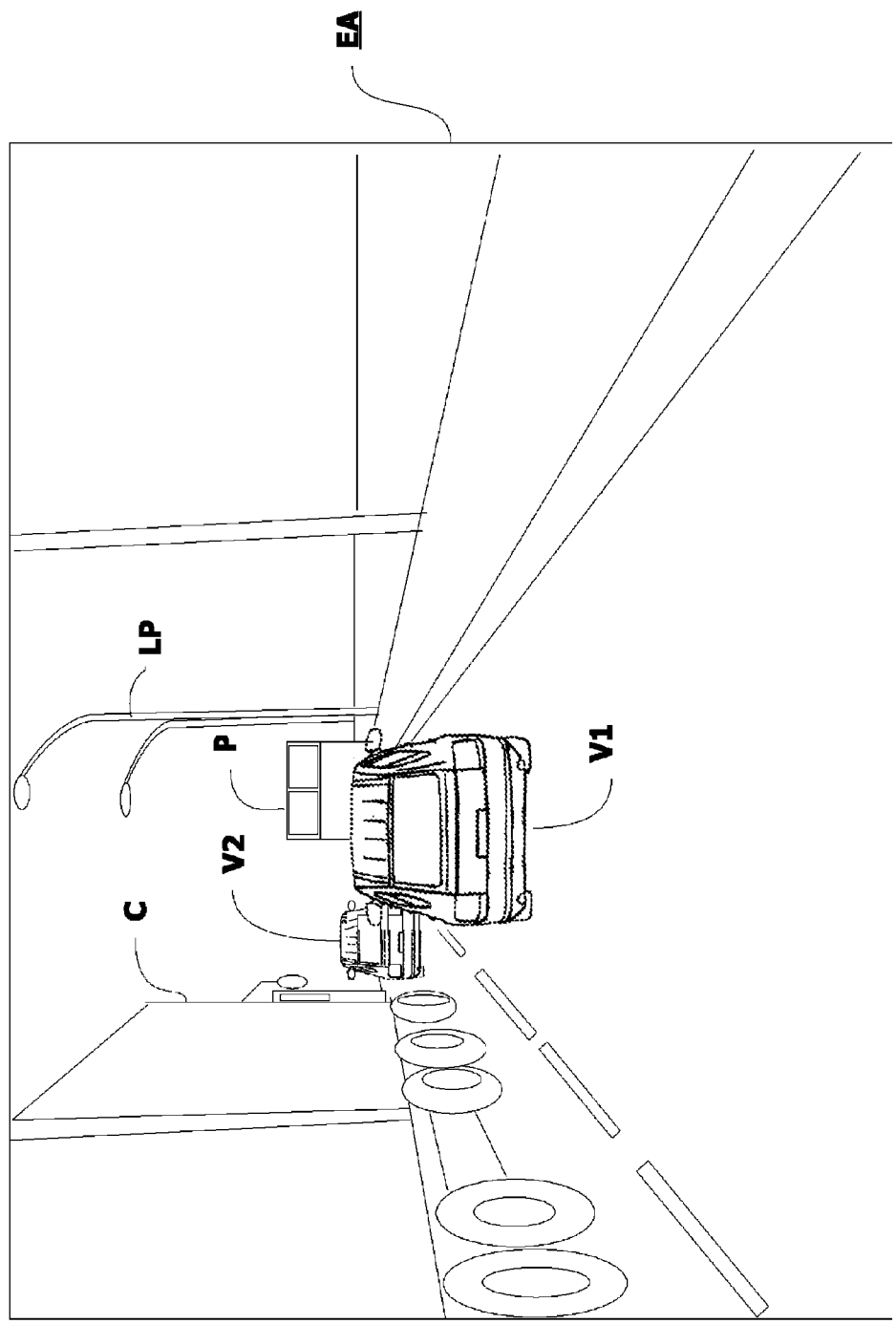
FIG. 2 represents an image of a front environment of a motor vehicle comprising various target objects that can be detected by radar, according to one step of the FIG. 1 detection method.

An example of a front environment EA of the motor vehicle V is shown in FIG. 2. As can be seen, the front environment EA includes the following target objects:
- a first followed vehicle V1;
- a second followed vehicle V2;
- a road sign P;
- a lorry or motor truck C; and
- at least one street lamp LP.

Figure 3:
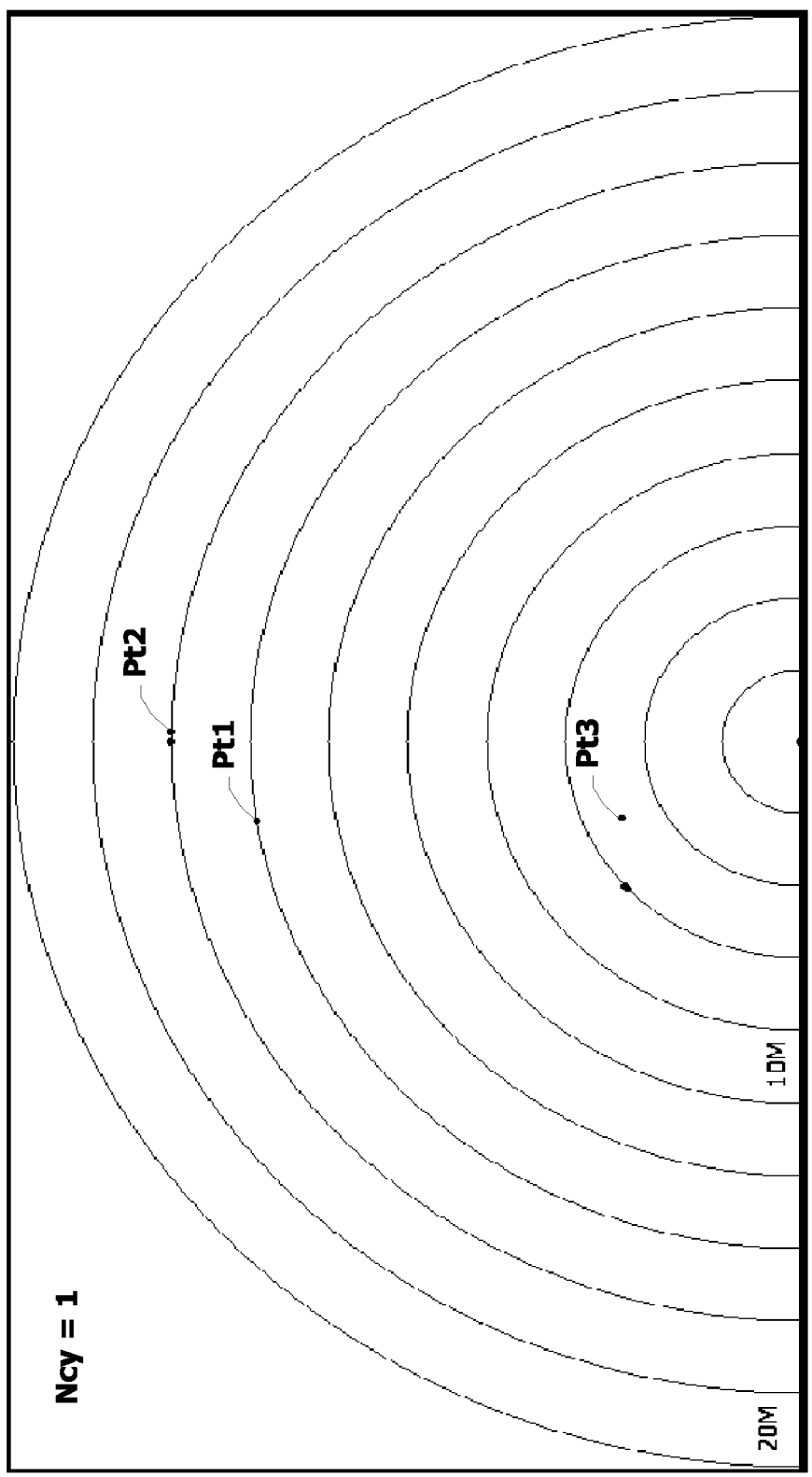
FIG. 3 represents target points sent back by a radar and representative of the target objects from FIG. 2.

Target objects O are detected by means of a target object detector such as a radar RAD that sends back the following information:
- target points Pt corresponding to the target objects of the front environment EA of the motor vehicle V (one example of target points Pt sent back is shown in FIG. 3);
- a position POS_Pt of the target points Pt relative to the motor vehicle V, the position comprising:
   - a distance D of a target point relative to the motor vehicle V;
   - an angle Beta of a target point Pt relative to the radar;
   - a radial speed Vr of a target point Pt;
   - a power P of the echo reflected by a target point Pt; and information B corresponding to noise.

Detection by radar RAD being familiar to the person skilled in the art, it is not described here.

Note, however, that a radar sends back the above information after 40 ms in the non-limiting example of a radar operating at 24 GHz. It is referred to as a cycle time of 40 ms.

Note moreover that such a radar RAD is effective for speeds between 0 and approximately 70 kph. Consequently, the maximum distance of a target point Pt between two radar cycles is 77 cm in the non-limiting example considered here.

In a second step 2, a position POS_Pt of at least one target point Pt relative to a motor vehicle V is corrected depending on a movement Dm of the motor vehicle V over a given number Ncy of cycles.

The object of this step is to stabilize the radar data in order to avoid losing target points Pt.

The radar RAD sends back a list of target points. It can happen that, at a time t, it detects a target point Pt, that it loses it at time t+1, and that it reappears later.

In a non-limiting embodiment, the given number Ncy of cycles is equal to 5. Beyond this number, it is considered that the clouds of target points are too dense to be able to process them and that cloud of points would overlap.

Accordingly, over five cycles (i.e. over 200 ms for the example used here of a cycle time of 40 ms) a set of target points Pt is acquired and the correction is effected by:
- subtracting the movement in translation Dv of the motor vehicle V (i.e. the path traveled by the motor vehicle V) from the distance D associated with each target point Pt, in each cycle CY; and subtracting the movement in rotation Dr of the motor vehicle V (obtained from the jaw speed VI of the motor vehicle) from the angle Beta associated with each target point Pt, in each cycle CY.

Figure 4:
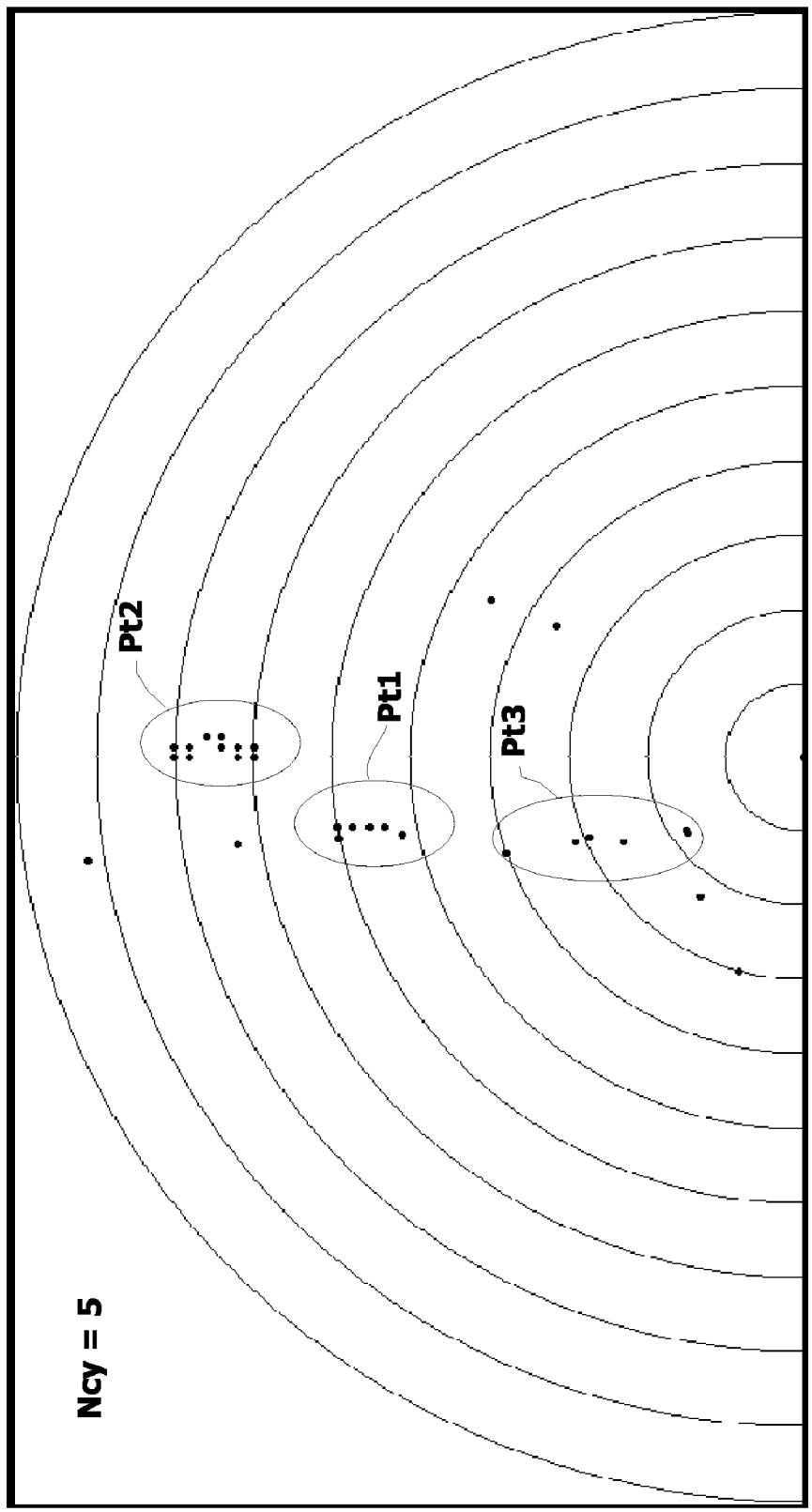
FIG. 4 represents target points sent back by a radar and representative of the target objects from FIG. 2 over a given number of cycles.

FIG. 4 shows a non-limiting example of the result of the second step. As can be seen, in the example described here the movement of a target point Pt and therefore of a corresponding target object O can be tracked over the five cycles.

It can be seen that there are three target points Pt1, Pt2 and Pt3 that appear to correspond to three target points that are mobile, as each target point forms a cloud over the five cycles.

Note that the result over the five cycles would be a denser cloud in the case of a target point that corresponds to a fixed target object.

In a third step 3 (FIG. 1), starting from at least one target point Pt, a first group CL1 with adjacent target points Ptv is formed depending on a first given characteristic c1.

This produces a so-called "spatial" grouping.

As described in detail hereinafter, this step:
distinguishes a fixed target object from a mobile target object;
distinguishes objects from noise; and
distinguishes objects from each other.

In a non-limiting embodiment of the invention, the first given feature c1 is a distance less than a distance threshold d1 between a target point Pt and adjacent target points Ptv. In one non-limiting example, this distance threshold d1 is equal to one meter. For a vehicle speed Vit of 70 kph and a cycle time of 40 ms, the maximum distance D obtained for a target point Pt between two cycles is 77 cm (see above). This value is rounded to 1 m.

In the FIG. 5 example there can be seen on the left the result of the second step which thus groups a set of target points over five cycles.

In this set of target points, starting from a first given target point Pt1, all adjacent target points Ptv1 are determined that are at a distance D from the first target point Pt1 less than the threshold value d1. In the example considered here, adjacent points Ptv1 that satisfy this criterion of d1 being equal to one meter are in a first vicinity circle Cptv1. In the FIG. 5 example, the target points Pt2, Pt3 and Pt4 are adjacent points of the first target point Pt1.

Then, starting from each adjacent point Ptv1 of the first point Pt1, the same vicinity criterion is applied successively. Thus in one non-limiting embodiment of the invention the step of forming a first group CL1 includes a substep of applying the first given characteristic c1 successively to the adjacent points Ptv.

At the end of this process a group CL1 is obtained that combines all the adjacent points.

Such grouping is effected again starting from a second given target point, a second first group CL1' is thus obtained, and so on. In the FIG. 5 example, the second target point is the target point Pt5. This point Pt5 does not in fact belong to the group CL1 because it is not one of the target points that were found in the vicinity of the first given point Pt1 or its successive adjacent points.

In one non-limiting embodiment, a given point Pt considered for this step is a first point encountered when the radar performs a radar scan and thus does not belong to any group. In one non-limiting embodiment of the invention, radar scanning corresponds to sweeping the front environment of the vehicle from left to right according to an aperture angle of the radar RAD.

In one non-limiting embodiment of the invention, when the groups are formed, there is eliminated first of all the group CL1 comprising a number of target points less than a first given number nb1. In one non-limiting example, the first given number nb1 is equal to 3.

This eliminates noise. A first group that comprises too few target points corresponds to noisy information coming from the radar RAD. Thus in the FIG. 5 example the group CL1' is eliminated as it comprises only one point, the point Pt5. This group is too small to be considered a group and therefore as a potential target object O.

In a fourth step 4, whether a first group CL1 is homogeneous is verified depending on a second given characteristic c2.

In a first non-limiting embodiment of the invention the second given characteristic c1 is an associated power P.

In a second non-limiting embodiment of the invention the second given characteristic c2 is an associated speed Vit.

These two criteria are used to judge the homogeneity of a first group CL1 as explained hereinafter.

Where the power P is concerned, the larger and more metallic a target object, the more power it sends back. There are therefore power differences according to the various target objects. Thus a motor cycle, a car or a lorry send back different powers.

Where the speed Vit is concerned, there are speed differences between two objects and in particular between a mobile target object and a fixed target object.

As explained hereinafter, two close target objects can thus be separated with speed differences or power differences, and in particular a mobile target object can be separated from a fixed target object.

In a non-limiting variant, to calculate the homogeneity of a first group CL1 depending on a power criterion P and/or a speed criterion Vit for the target points of the first group CL1, a standard deviation ECT is calculated for each criterion.

Thus the standard deviation ECT is calculated using the following formula:

$$\sigma_X = \sqrt{\frac{1}{n}\sum_{i=1}^{n}(x_i - \overline{x})^2} \quad où: \overline{x} = \frac{1}{n}\sum_{i=1}^{n}x_i.$$

where:
$x_i$ is the radial speed of a target point Pt of a first group CL1;
$\overline{X}$ is the average of the radial speeds of all the target points Pt of the first group CL1;
n is the number of target points of the first group CL1.

The same formula is used for the power P.

It will be recalled that as explained above the radial speed Vr is given by the radar RAD for each target point Pt. The same applies to the power P.

To determine the homogeneity of a group, the power standard deviation ECTp calculated is compared to a power threshold THp and the speed standard deviation ECTvit calculated is compared to a speed threshold THvit.

In a non-limiting embodiment of the invention, the power threshold THp is equal to 4 dB. This threshold is determined empirically and represents a power difference between different target objects such as a lorry, a car or a motor cycle.

In a non-limiting embodiment of the invention, the speed threshold THvit is equal to 3 m/s. This threshold is determined empirically and makes it possible to distinguish mobile and fixed target objects or two target objects that are close together.

In a non-limiting example, to determine the thresholds THp and THvit empirically, a statistical study is carried out of the power/speed standard deviations concerning groups of target points corresponding to two distinct real objects.

Accordingly, in a non-limiting embodiment of the invention, whether a group is homogeneous or not is verified in the following manner:
a) if the speed standard deviation ECTv exceeds the speed threshold THvit, then this means that the first group CL1 is heterogeneous, and the fifth step (5) below is therefore effected;
b) if not, the power standard deviation ECTp is verified and if it exceeds the power threshold THp, this means that the first group CL1 is heterogeneous and the fifth step (5) below is therefore effected;
c) if not, this means that the power and speed standard deviations are both below their respective thresholds THp and THvit, and consequently this indicates that the first group CL1 is homogeneous; in this case the process proceeds directly to the seventh step (7) described hereinafter.

Thus if a first group CL1 of target points Pt has heterogeneous speeds, this means that this group of target points corresponds to two distinct real target objects.

Thus if the first group CL1 is heterogeneous, in a fifth stage (5) two reference target points Ref1 and Ref2 are deduced that are closest to the following respective values Val:

$Val1 = \overline{Val}mean + ECT$ $Val2 = \overline{Val}mean - ECT$ and in a non-limiting embodiment of the invention target points of a first group CL1 are grouped around the two reference target points Ref1, Ref2, the combination forming two second groups CL2. A second group CL2 is thus a subgroup of a first group CL1.

Figure 6:
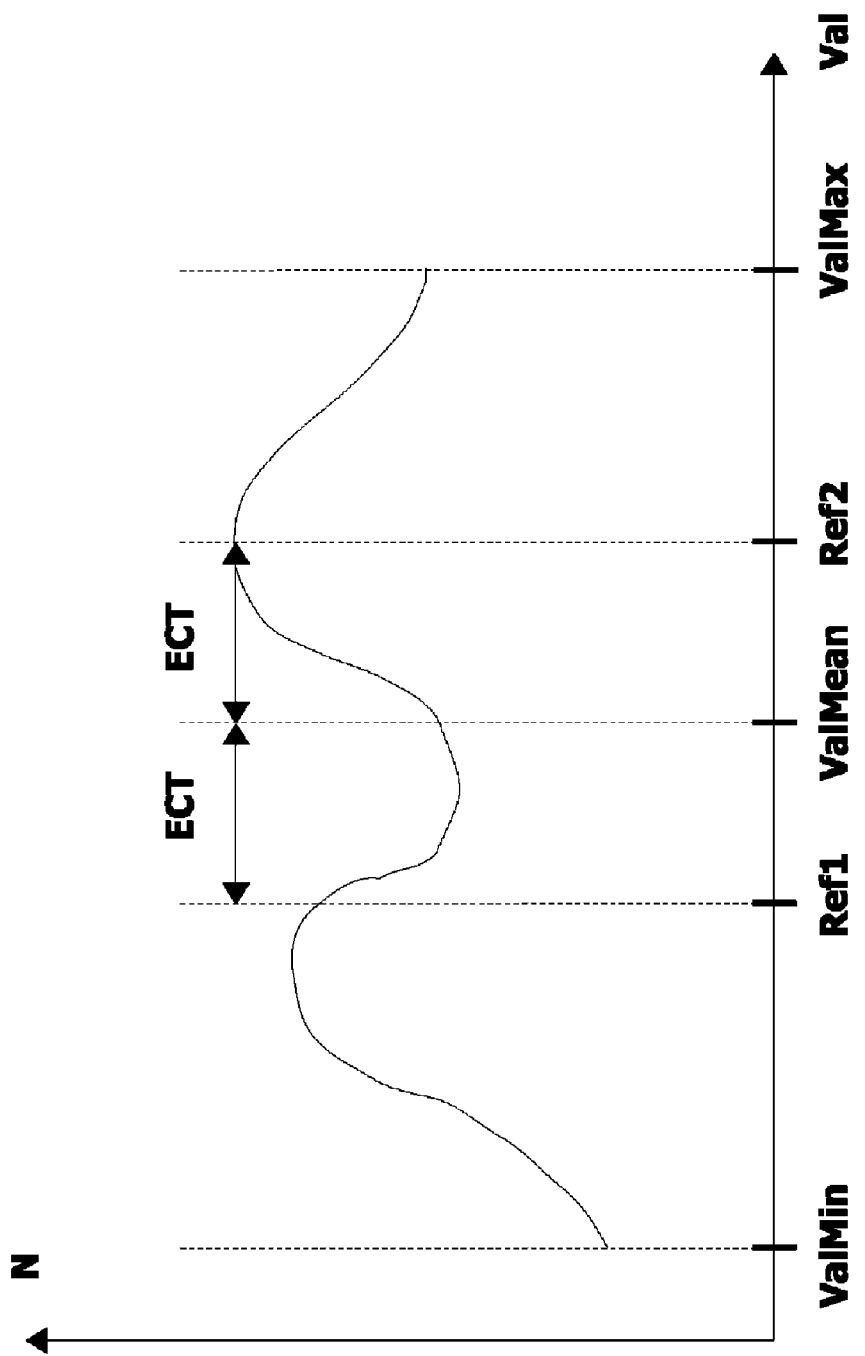
FIG. 6 represents standard deviations used to calculate the homogeneity of a first group according to a step of the FIG. 1 detection method.

Accordingly, as shown in FIG. 6, if a group is heterogeneous, it is assumed that, according to at least one of the two criteria (power and/or speed), the values are spread over a range of minimum values Valmin and maximum values Valmax. Some of the values corresponding to the target points Pt are below the mean value Valmean and some above.

A non-limiting example of two reference points Ref1 and Ref2 is shown in FIG. 7.

In a non-limiting embodiment of the invention, grouping into a second group CL2 is effected by an agglomeration method using a minimization of group inertia criterion.

This method groups the target points of a first group CL1 around a reference target point Ref and minimizes the inertia of the second group CL2 created in this way.

Here the inertia is a criterion of homogeneity of a second group.

Each association of a point with a group influences the inertia of the group. The greater the inertia of the group, the more heterogeneous the group. Accordingly, for a given target point, the increase of the inertia is calculated for each second group. Thus the target point is associated with the second group for which it will influence least the heterogeneity of the group, i.e. the group whose inertia it will increase the least.

To this end, in a non-limiting variant of the invention, a Ward Index WI is applied to a speed or to a power. In one non-limiting embodiment of this variant of the invention, the center of gravity of a weight of a target point Pt (here the speed or the power) is used instead of using a distance in the conventional way, using the weight of a target point Pt directly. Using the speed or the power is more effective than using the distance, which has already been used during the "spatial" grouping discussed above.

This Ward Index WI quantifies the increase in inertia without calculating the inertia of the group.

Accordingly, for each target point Pt the Ward index WI is calculated twice (once for each of the two second groups CL2 obtained) and the target point is associated with the second group having the smaller Ward Index WI.

The formula for the Ward Index applied as described above to the speed criterion Vit is therefore as follows:

$$WIv = \frac{Va * \overline{V}}{Va + \overline{V}} * \sum_{1}^{n} (Va - Vi)^2$$

where:
  $\overline{V}$ is the mean value of the speeds Vit of the target points of a second group CL2;
  n is the number of points in the second group CL2; and
  Va is the speed of the target point to be agglomerated.

The formula for the Ward Index applied as described above to the power P criterion is therefore as follows:

$$WIp = \frac{Pa * \overline{P}}{Pa + \overline{P}} * \sum_{1}^{n} (Pa - Pi)^2$$

where:
  $\overline{P}$ is the mean value of the power P of the target points of a second group CL2;
  n is the number of points in the second group CL2; and
  Pa is the power of the target group to be agglomerated.

As shown in the FIG. 7 example, two homogeneous second groups CL2' and CL2" are obtained in this way for each of the power criterion P and the speed criterion Vit.

Note that in the embodiment of the invention described for the fourth step 4, for the case a) (ECTv>THvit) the Ward Index applied to the speed Wlv is used and for the case b) (ECTp>THp) the Ward Index applied to the power Wlp is used.

In a sixth step 6, in a non-limiting embodiment of the invention, starting from at least one target point Pt of a second group CL2, a first group CL1 is formed with adjacent target points Ptv depending on a first given characteristic c1.

Thus a "spatial" grouping is effected as in step 3. This provides spatial concentration of the points.

In a non-limiting embodiment of the invention, the first given characteristic c1 is a distance less than a distance threshold d1 between a target point Pt and adjacent target points Ptv, as described above.

Figure 8:
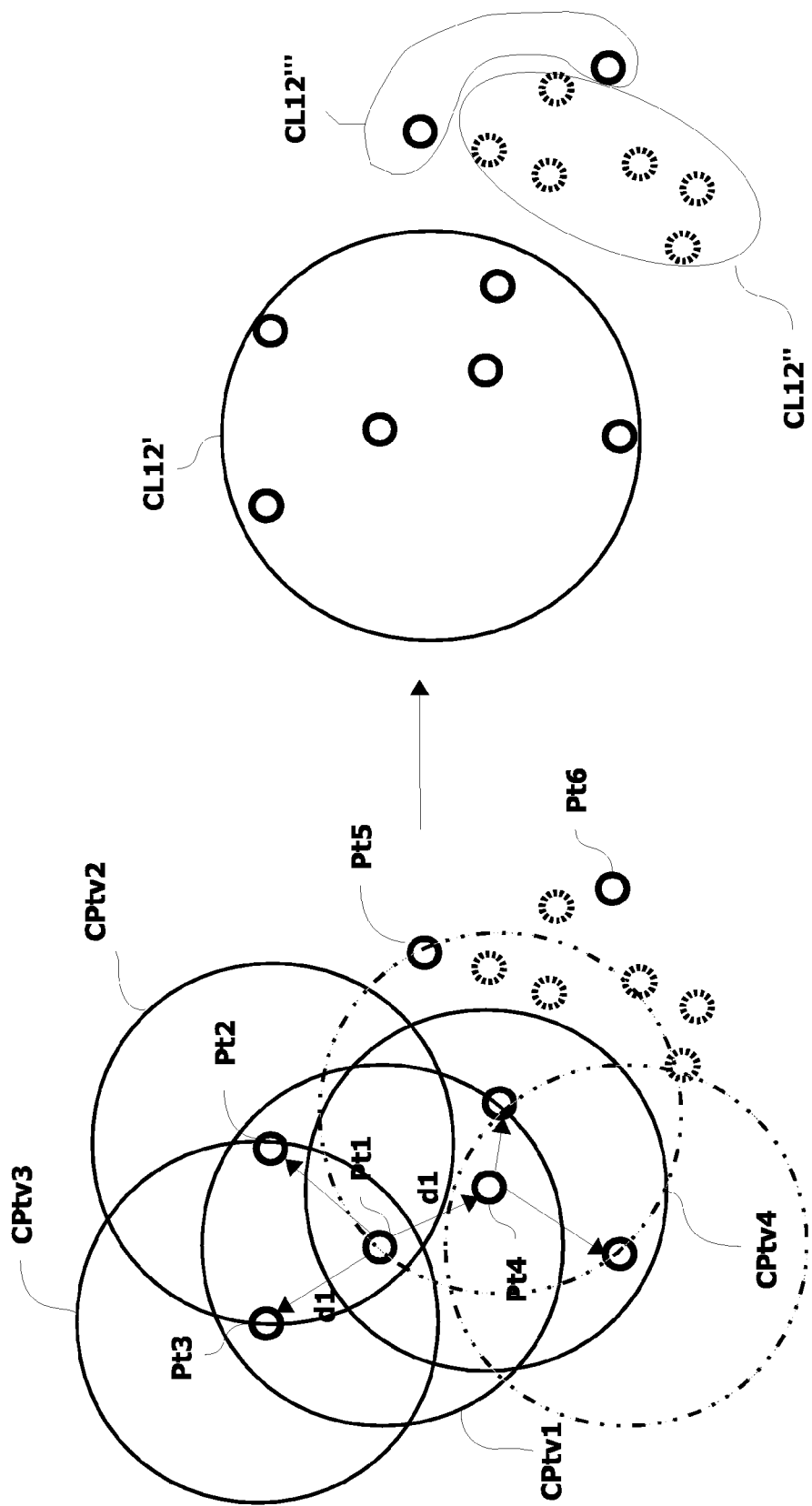
FIG. 8 represents the combining of target points of a first group with a reference target point from FIG. 7 to form at least one second group according to a step of the FIG. 1 detection method.

Accordingly, as can be seen in FIG. 8, three first groups CL12', CL12" and CL12''' are obtained from the two homogeneous groups CL2' and CL2".

Then, as before in the third step, any first group CL12 that comprises a number of target points less than a first given number nb1 is eliminated. In a non-limiting example, the first given number nb1 is equal to 3.

This eliminates the noise. Thus, in the FIG. 8 example, the group CL12''' is eliminated because it comprises only two points, the points Pt5 and Pt6. This group is too small to be considered a group and therefore as a potential target object O.

This sixth step distinguishes between two target objects that are relatively close together and moving at different speeds or that are moving at similar speeds but with different powers.

In a seventh step 7, a position POS is calculated of a formed group CL1; CL2; CL12 relative to the motor vehicle over the given number Ncy of cycles, a formed group CL1; CL2; CL12 corresponding to a target object O.

Note that the group position calculation is carried out for:
- a first group CL1 (if a first group is homogeneous as described for the fourth step);
- a first group CL21 (if it is obtained in the sixth step); or
- a second group CL2 (if a first group is heterogeneous as described for the fifth step or the sixth step is not executed).

In one non-limiting embodiment of the invention a position of a group CL1, CL2 is calculated laterally and longitudinally relative to the motor vehicle V.

In a non-limiting variant of the invention, a position is calculated by linear regression over time. There will therefore be two linear regressions over time associated with the lateral position (x) and the longitudinal position (y), respectively.

Figure 9:
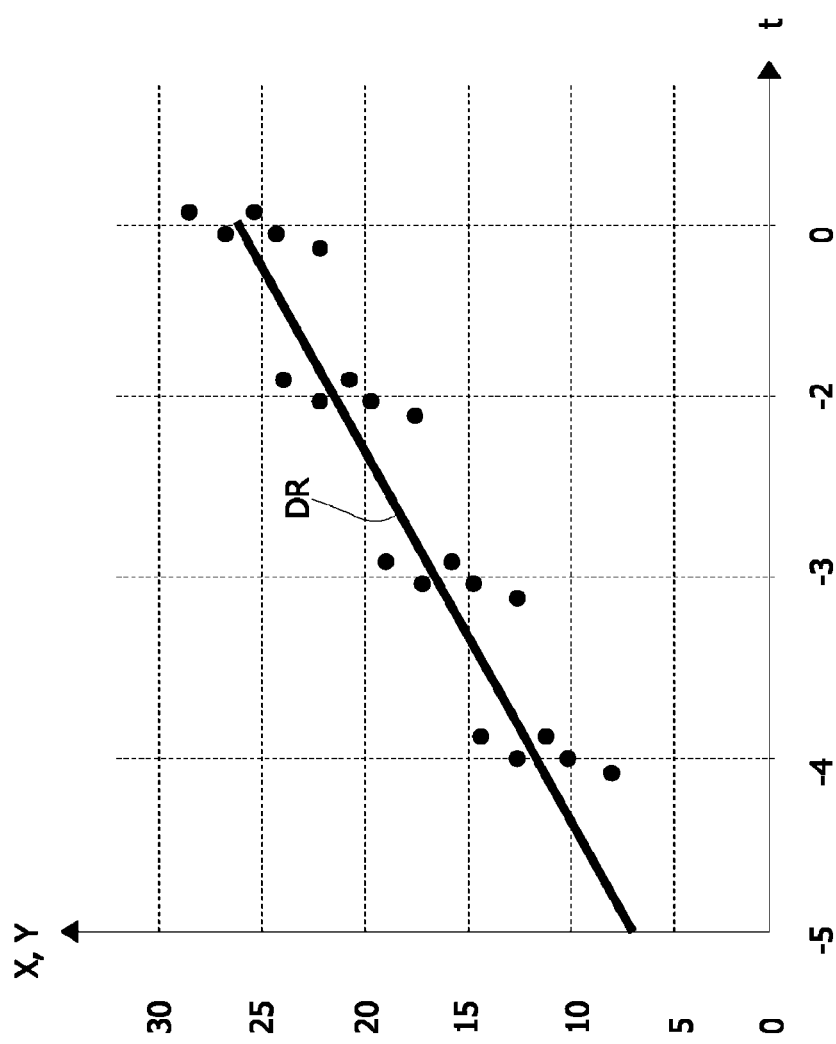
FIG. 9 represents the calculation of the position of a group during a step of the FIG. 1 detection method.

The linear regression is effected in the following manner:

A group includes a cloud of points made up of targets returned by the radar over the given number Ncy of cycles, here five cycles, and thus at the times t−4, t−3, t−2, t−1 and t, as shown diagrammatically in FIG. 9 by way of non-limiting example. At each of these times there are therefore clouds of target points more or less spatially scattered relative to the motor vehicle V.

The linear regression seeks a straight line DR minimizing the distances between said straight line and the target points.

The position of the group of points at the time t is then estimated using this straight line DR.

A cloud of points is deemed to be a vehicle (lorry, car, motorcycle, etc.) in reality and so calculating the position of a cloud of points gives an estimate of the real position of a target object O.

Thus as a target object O moves, its lateral (y) and longitudinal (x) position POS is determined.

Figure 10:
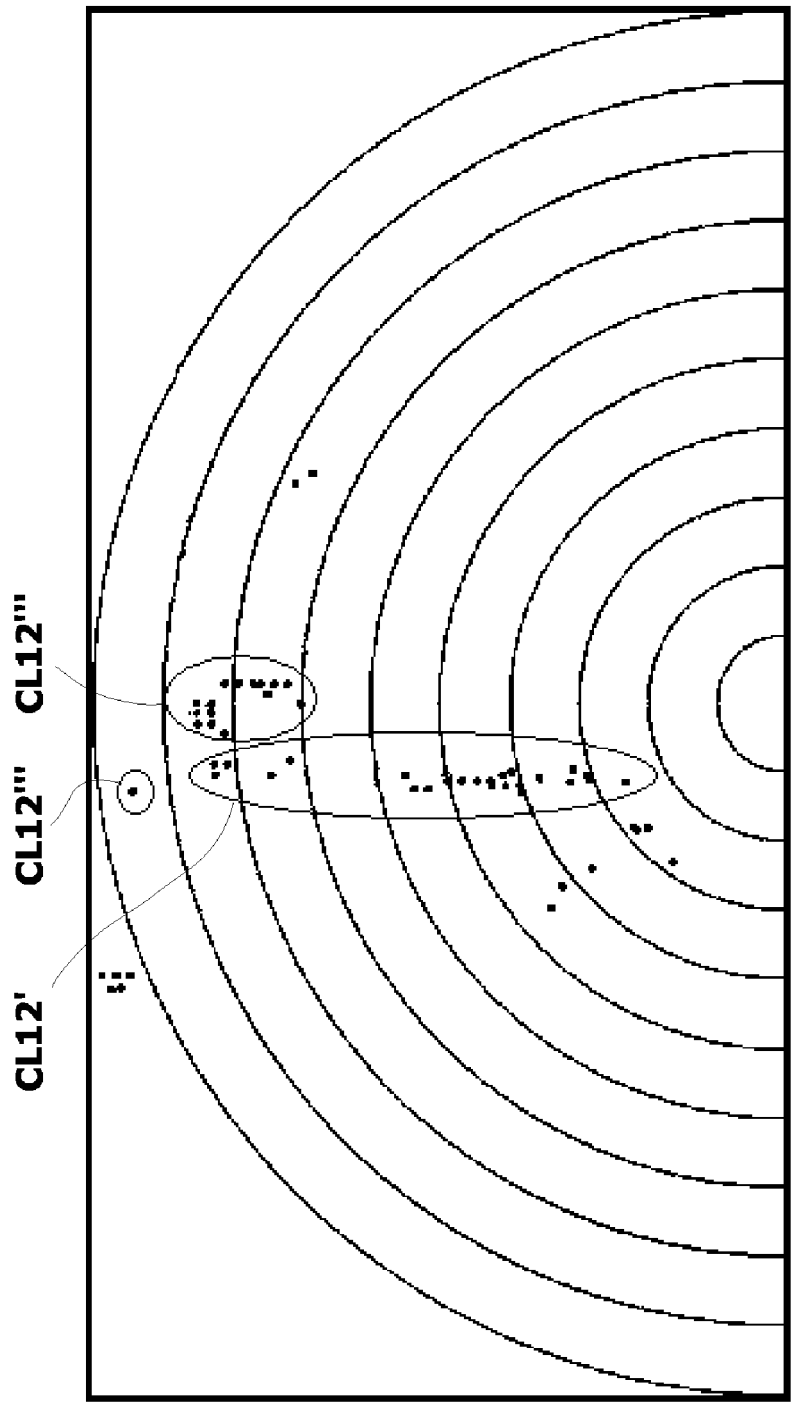
FIG. 10 represents a first non-limiting example of target points obtained as in FIG. 8 after Kalman filtering according to a step of the FIG. 1 detection method.
Figure 11:
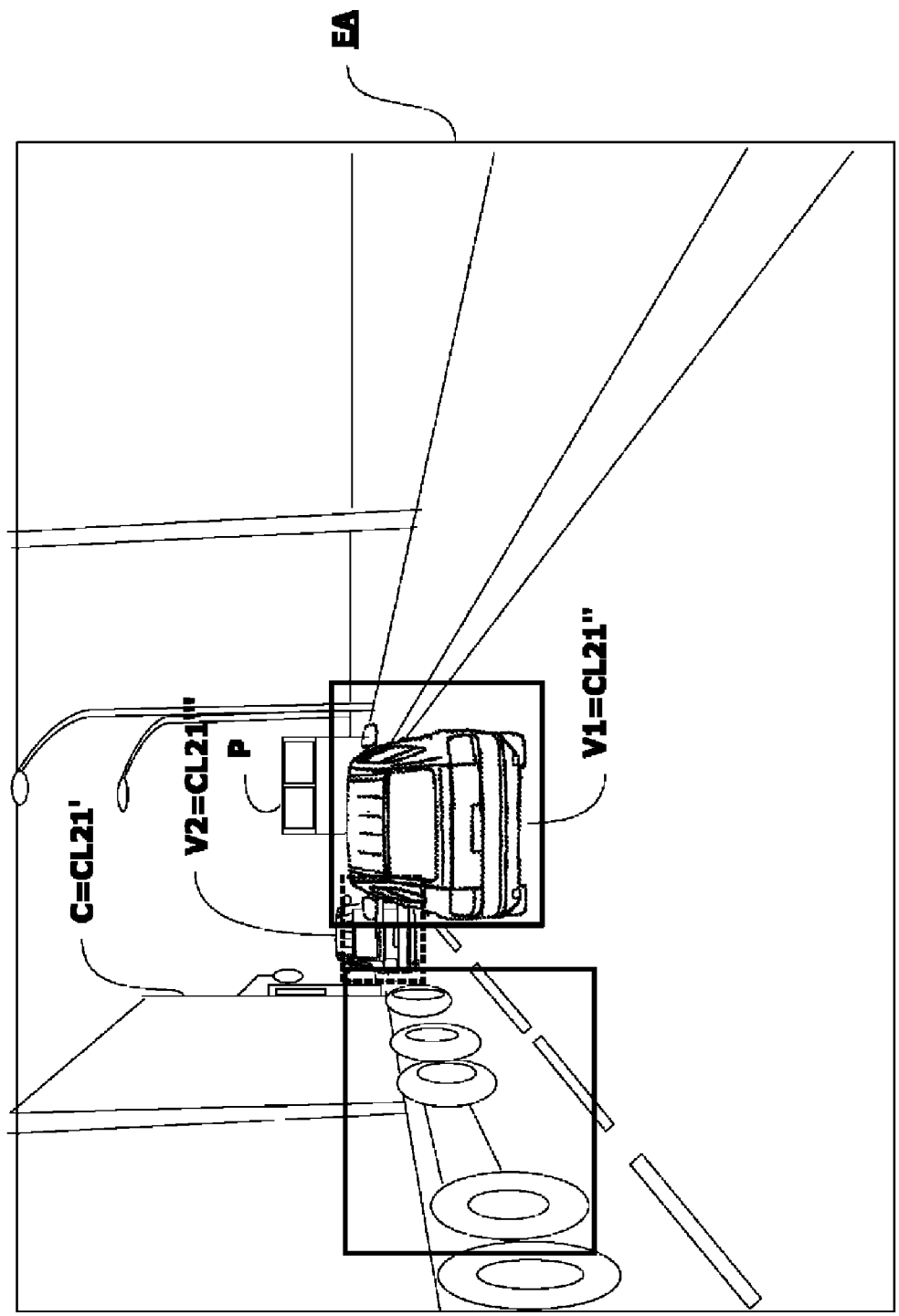
FIG. 11 represents an image of the front environment of the motor vehicle with target objects detected by the FIG. 1 detection method.

Thus, as shown in the non-limiting example of FIG. 10, the movement is obtained of three groups CL21', CL21" and CL2''' corresponding to three target objects that in the present example comprise a first car V1, a lorry C and a second car V2, as shown diagrammatically in FIG. 11. This figure shows a diagrammatic visualization of the recognized objects.

In an eighth step 8, a Kalman filter is applied to two successive positions of a formed group CL1, CL2.

The filter takes into account noise associated with the sensors and corrects and predicts the state of a model under study, here the position of a target object seen by the radar RAD.

The filter corrects the measurement of the position at the time t depending on its prediction at the time t−1 and predicts the position of the measurement at the time t+1.

This stabilizes the position POS (x, y) of the target objects O detected by the radar RAD. Positions that are stable over time are thus obtained.

The Kalman filter being familiar to the person skilled in the art, it is not described in more detail here.

Thus the steps 1 to 8 described above are executed in real time, as the vehicle V concerned moves and thus as potential target objects in the environment of the vehicle V move.

Thus the method described detects a target object in the environment of the vehicle V concerned and in particular distinguishes one target object from another target object, in particular if two target objects such as two vehicles are close together, for example, as is the case with the lorry C and the first car V1 in FIG. 11.

Figure 12:
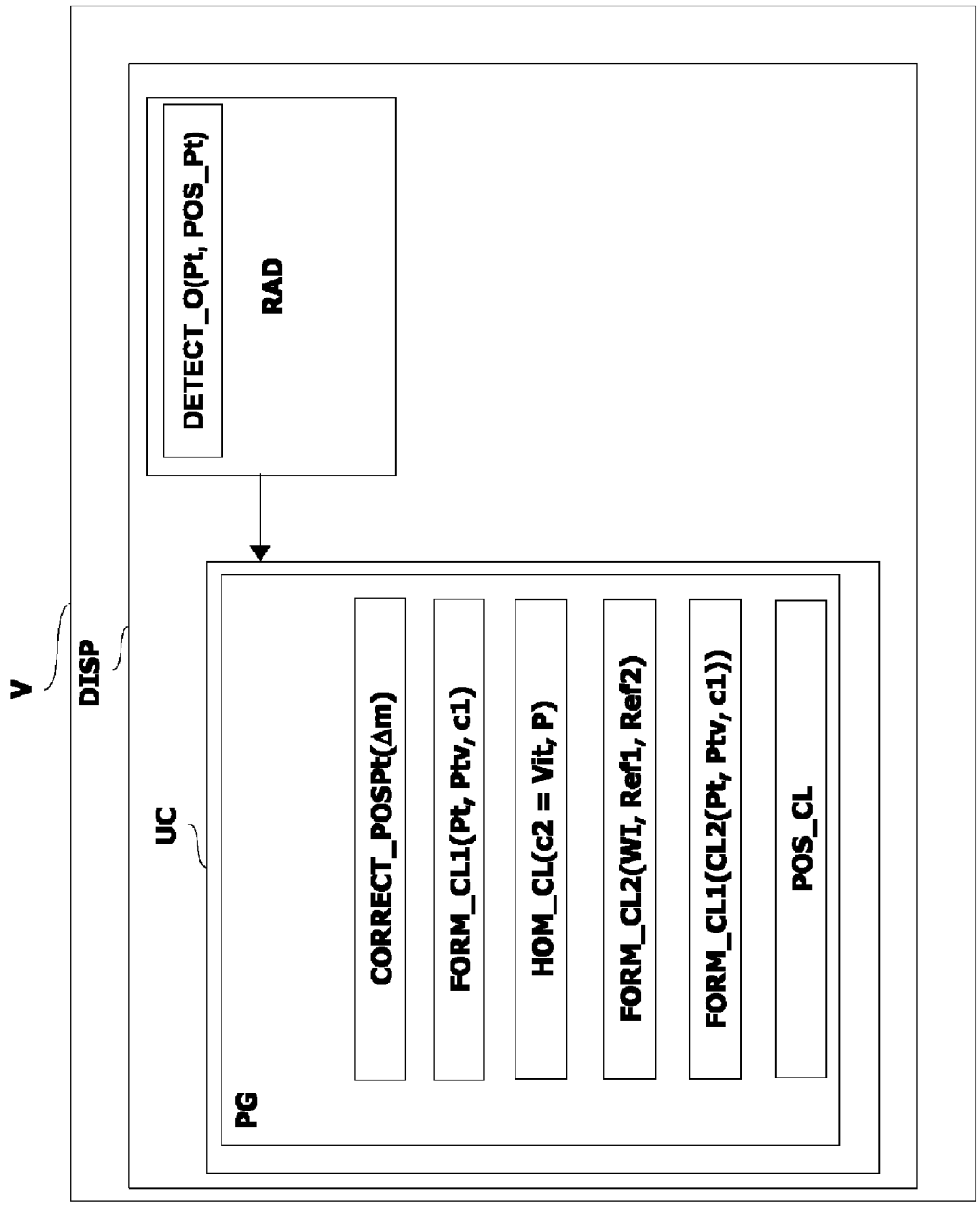
FIG. 12 shows a non-limiting example of a device for implementing the FIG. 1 method.

The method of the invention is implemented by a device DISP for detecting a target object O for a motor vehicle V shown in FIG. 12.

This device DISP is integrated into the motor vehicle V.

This device DISP includes in particular a control unit UC for:
- correcting a position POS_Pt of at least one target point Pt relative to a motor vehicle V depending on a movement of the motor vehicle over a given number Ncy of cycles;
- starting from at least one target point Pt1, forming a first group CL1 with adjacent target points Ptv1 depending on a first given characteristic c1;
- verifying if the first group CL1 is homogeneous depending on a second given characteristic c2; and
- calculating a position POS of a formed group CL1, CL2 relative to the motor vehicle over the given number Ncy of cycles, a group formed of CL1, CL2 corresponding to a target object O.

In a non-limiting embodiment of the invention, the device DISP further includes a detector RAD for detecting a plurality of target objects O in an environment of the motor vehicle V relative to the motor vehicle V, resulting in a plurality of representative target points Pt and their respective position POS_Pt. In a non-limiting example, the detector is a radar RAD. In a non-limiting embodiment of the invention, the radar RAD has the following features:
- it operates at a statutory frequency of 24 GHz and thus has a cycle time of 40 ms;
- its detection range is from 0.75 to 60 meters;
- it returns up to 100 targets; and
- it has an aperture angle of 150°.

These features are not limiting on the invention, of course. Thus another frequency can be used, such as the statutory frequency of 77 GHz, for example.

Note that the detection method described above can be implemented by means of a micro-programmed device "software", wired logic and/or electronic components "hardware".

Thus the detection device DISP can include a computer program product PG including one or more sequences of instructions that can be executed by an information processing unit such as a microprocessor or a processing unit of a microcontroller, an ASIC, a computer, etc., executing the sequences of instructions implementing the method described.

Such a computer program PG can be written in non-volatile writable memory of ROM type or in non-volatile rewritable memory of EEPROM or FLASH type. The computer program PG can be written into memory by the manufacturer or loaded into memory or downloaded into memory. The sequences of instructions can be sequences of machine instructions or sequences of a command language interpreted by the processing unit at the time of their execution.

In the non-limiting example of FIG. 12, the computer program PG is written in a memory of the control unit UC of the device DISP.

Of course, the description of the method is not limited to the embodiments and examples described above.

Thus the advantages of the invention include:
- it removes noise by eliminating groups of points that are too small;
- it avoids loss of target points by maintaining acquisition of target points over a given number of cycles;
- it groups target points that are as homogeneous as possible and thus potentially belong to the same real target object;
- it distinguishes one target object from another by means of the power;
- it distinguishes two target objects that are spatially close together and have different speeds, and thus in particular a mobile target object from a fixed target object;

it stabilizes the calculation of a position of a target object over time using a Kalman filter;

it is easily integrated into a module already using the automatic radar detection function; and it is simple, fast and economical to implement because the processing of the various steps is simple, fast and economical.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

The invention claimed is:

1. A method of detecting a target object for a motor vehicle, wherein said method includes the steps of:
    correcting a position of at least one target point relative to the motor vehicle depending on a movement of the motor vehicle over a given number of cycles;
    starting from said at least one target point, forming at least one formed group with adjacent target points depending on a first given characteristic;
    eliminating from at least one formed group, any target points that are not adjacent said at least one target point using said first given characteristic;
    verifying if said at least one formed group is homogeneous depending on a second given characteristic; and
    calculating a position of said at least one formed group relative to the motor vehicle over said given number of cycles, a position of said at least one formed group of said at least one target point and said adjacent target points corresponding to an estimate of a real position of said target object.

2. The detection method according to claim 1, wherein said second given characteristic is a power.

3. The detection method according to claim 1, wherein said second given characteristic is a speed.

4. The detection method according to claim 1, wherein said first given characteristic is a distance less than a distance threshold between said at least one target point and said adjacent target points.

5. The detection method according to claim 1, wherein a position of said at least one formed group is calculated laterally and longitudinally.

6. A method of detecting a target object for a motor vehicle, wherein said method includes the steps of:
    correcting a position of at least one target point relative to the motor vehicle depending on a movement of the motor vehicle over a given number of cycles;
    starting from said at least one target point, forming a first group with adjacent target points depending on a first given characteristic;
    verifying if said first group is homogeneous depending on a second given characteristic; and
    calculating a position of a formed group relative to the motor vehicle over said given number of cycles, said formed group corresponding to a target object;
    including an additional step of detecting a plurality of target objects in an environment of the motor vehicle relative to the motor vehicle, resulting in a plurality of representative target points and their respective positions.

7. The detection method according to claim 6, wherein the step of forming a first group includes a sub-step of applying said first given characteristic successively to said adjacent target points.

8. The detection method according claim 6, including an additional step of eliminating said first group comprising a number of target points less than a first given number.

9. The detection method according to claim 6, wherein said second given characteristic is a power.

10. The detection method according to claim 6, wherein said second given characteristic is a speed.

11. A method of detecting a target object for a motor vehicle, wherein said method includes the steps of:
    correcting a position of at least one target point relative to the motor vehicle depending on a movement of the motor vehicle over a given number of cycles;
    starting from said at least one target point, forming a first group with adjacent target points depending on a first given characteristic;
    verifying if said first group is homogenous depending on a second given characteristic; and
    calculating a position of a formed group relative to the motor vehicle over said given number of cycles, said formed group corresponding to a target object;
    wherein the step of forming a first group includes a sub-step of applying the first given characteristic successively to the adjacent target points.

12. A method of detecting a target object for a motor vehicle, wherein said method includes the steps of:
    correcting a position of at least one target point relative to the motor vehicle depending on a movement of the motor vehicle over a given number of cycles;
    starting from said at least one target point, forming a first group with adjacent target points depending on a first given characteristic;
    verifying if said group is homogeneous depending on a second given characteristic; and
    calculating a position of a formed group relative to the motor vehicle over said given number of cycles, said formed group corresponding to a target object;
    including an additional step of eliminating any first group comprising a number of target points less than a first given number.

13. A method of detecting a target object for a motor vehicle, wherein said method includes the steps of:
    correcting a position of at least one target point relative to the motor vehicle depending on a movement of the motor vehicle over a given number of cycles;
    starting from said at least one target point, forming a first group with adjacent target points depending on a first given characteristic;
    verifying if said first group is homogeneous depending on a second given characteristic; and
    calculating a position of a formed group relative to the motor vehicle over said given number of cycles, said formed group corresponding to a target object;
    including an additional step in which, if a group is heterogeneous, target points of said first group are grouped around two reference target points, the combination forming two second groups, so as to minimize the inertia of second group.

14. The detection method according to claim 13, including an additional step of, starting from said at least one target point of said second group, forming said first group with adjacent target points depending on said first given characteristic.

15. A method of detecting a target object for a motor vehicle, wherein said method includes the steps of:
    correcting a position of at least one target point relative to the motor vehicle depending on a movement of the motor vehicle over a given number of cycles;

starting from said at least one target point, forming a first group with adjacent target points depending on a first given characteristic;

verifying if said first group is homogeneous depending on a second given characteristic; and calculating a position of a formed group relative to the motor vehicle over said given number of cycles, said formed group corresponding to a target object;

wherein grouping into a second group is effected by means of a Ward Index.

16. The detection method according to claim 15, including an additional step of, starting from said at least one target point of said second group, forming said first group with said adjacent target points depending on said first given characteristic.

17. A method of detecting a target object for a motor vehicle, wherein said method includes the steps of:

correcting a position of at least one target point relative to the motor vehicle depending on a movement of the motor vehicle over a given number of cycles;

starting from said at least one target point, forming a first group with adjacent target points depending on a first given characteristic;

verifying if said first group is homogeneous depending on a second given characteristic; and calculating a position of a formed group relative to the motor vehicle over said given number of cycles, said formed group corresponding to a target object;

including an additional step of applying a Kalman filter to two successive positions of said formed group.

18. A device for detecting a target object for a motor vehicle, wherein said device comprises:

a control unit for:

correcting a position of at least one target point relative to the motor vehicle depending on a movement of the motor vehicle over a given number of cycles;

starting from said at least one target point, forming at least one formed group with adjacent target points depending on a first given characteristic;

eliminating from or not including ins said at least one group any target points that are not adjacent said at least one target point form said at least one formed group using said first given characteristic;

verifying if said at least one formed group is homogeneous depending on a second given characteristic; and calculating a position of said at least one formed group relative to the motor vehicle over said given number of cycles, a position of said at least one formed group of said at least one target point and said adjacent target points corresponding to an estimate of a real position of said target object.

19. The detection device according to claim 18, according to which it further includes a detector for detecting a plurality of target objects in an environment of the motor vehicle relative to the motor vehicle, resulting in a plurality of representative target points and their respective positions.

20. A computer program product including one or more sequences of instructions resident in memory that is non-transitory and executable by an information processing unit, the execution of said one or more sequences of instructions implementing the method according to claim 1.

* * * * *

UNITED STATES PATENT AND TRADEMARK OFFICE
CERTIFICATE OF CORRECTION

PATENT NO. : 8,378,883 B2  
APPLICATION NO. : 12/640239  
DATED : February 19, 2013  
INVENTOR(S) : Kouch Page 1 of 1

It is certified that error appears in the above-identified patent and that said Letters Patent is hereby corrected as shown below:

In the Claims

Claim 11, Col. 12, line 16, please delete "homogenous" and insert -- homogeneous -- therefor.

Claim 18, Col. 14, line 8, please delete "ins" and insert -- in -- therefor.

Claim 18, Col. 14, line 10, please delete "form" and insert -- from -- therefor.

Signed and Sealed this  
First Day of September, 2015

Michelle K. Lee  
*Director of the United States Patent and Trademark Office*